US008788356B2

(12) United States Patent
Georgis et al.

(10) Patent No.: US 8,788,356 B2
(45) Date of Patent: Jul. 22, 2014

(54) SYSTEM AND METHOD FOR EFFECTIVELY PROVIDING SOFTWARE TO CLIENT DEVICES IN AN ELECTRONIC NETWORK

(75) Inventors: Nikolaos Georgis, San Diego, CA (US); Adrian Crisan, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 871 days.

(21) Appl. No.: 12/587,456

(22) Filed: Oct. 7, 2009

(65) Prior Publication Data

US 2011/0083127 A1 Apr. 7, 2011

(51) Int. Cl.
*G06Q 30/00* (2012.01)
*G06Q 30/06* (2012.01)
*G06Q 30/02* (2012.01)

(52) U.S. Cl.
CPC ........ *G06Q 30/0601* (2013.01); *G06Q 30/0631* (2013.01); *G06Q 30/0254* (2013.01); *G06Q 30/0255* (2013.01); *G06Q 30/0242* (2013.01); *G06Q 30/0241* (2013.01)
USPC ... 705/26.1; 705/14.4; 705/14.41; 705/14.52; 705/14.53; 705/26.7

(58) Field of Classification Search
CPC .......... G06Q 30/0241; G06Q 30/0251; G06Q 30/0254; G06Q 30/0255; G06Q 30/0601; G06Q 30/0631
USPC .............. 705/14.4, 14.41, 14.52, 14.53, 26.1, 705/26.7
See application file for complete search history.

(56) References Cited

U.S. PATENT DOCUMENTS

| 5,771,347 | A  | * | 6/1998  | Grantz et al. ................... 726/31 |
|-----------|----|---|---------|------------------------------------------|
| 7,409,208 | B1 |   | 8/2008  | Clare et al.                             |
| 7,512,940 | B2 |   | 3/2009  | Horvitz                                  |
| 2003/0051015 | A1 |   | 3/2003  | Brown et al.                          |
| 2007/0143281 | A1 | * | 6/2007  | Smirin et al. ...................... 707/5 |
| 2008/0033882 | A1 | * | 2/2008  | Kafkarkou et al. ............. 705/52 |
| 2008/0183794 | A1 | * | 7/2008  | Georgis et al. ................ 709/201 |
| 2008/0215468 | A1 | * | 9/2008  | Monsa-Chermon et al. ... 705/34 |
| 2008/0228587 | A1 | * | 9/2008  | Slaney et al. ................... 705/26 |
| 2008/0294624 | A1 | * | 11/2008 | Kanigsberg et al. ............. 707/5 |
| 2008/0301746 | A1 | * | 12/2008 | Wiser et al. ................... 725/114 |
| 2009/0216621 | A1 | * | 8/2009  | Anderson et al. ............... 705/10 |
| 2009/0319436 | A1 | * | 12/2009 | Andra et al. .................... 705/80 |

* cited by examiner

*Primary Examiner* — Calvin Cheung
(74) *Attorney, Agent, or Firm* — Gregory J. Koerner; Redwood Patent Law

(57) ABSTRACT

A system and method for effectively supporting software distribution in an electronic network includes a software server and a network of client devices. The software server stores software items received from a software provider. The software items include various types of trial software that is provided to device users for temporary evaluation and potential purchase. A recommendation engine of the software server creates recommendation lists to identify optimal candidates from among the stored software items for performing an automatic and transparent software download procedures. The recommendation engine creates the recommendation lists by analyzing selectable software-ranking criteria related to device users of the client devices. The software server then downloads the optimal candidates from the stored software items to respective target devices during the software download procedures.

20 Claims, 11 Drawing Sheets

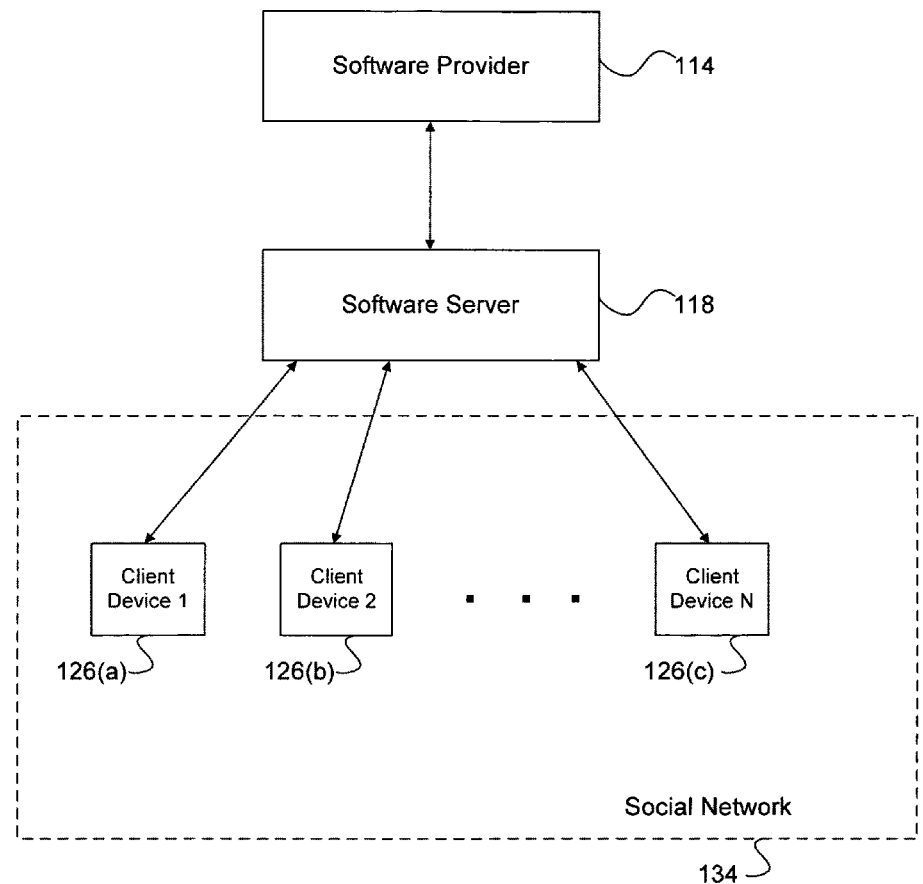
110      FIG. 1A

SYSTEM AND METHOD FOR EFFECTIVELY PROVIDING SOFTWARE TO CLIENT DEVICES IN AN ELECTRONIC NETWORK

BACKGROUND SECTION

1. Field of the Invention

This invention relates generally to techniques for managing electronic information, and relates more particularly to a system and method for effectively providing software to client devices in an electronic network.

2. Description of the Background Art

Implementing effective methods for managing software is a significant consideration for designers and manufacturers of contemporary electronic devices. However, effectively managing software utilized by devices in an electronic network may create substantial challenges for system designers. For example, enhanced demands for increased device functionality and performance may require more system processing power and require additional software resources. An increase in processing or software requirements may also result in a corresponding detrimental economic impact due to increased production costs and operational inefficiencies.

Furthermore, enhanced device capability to perform various advanced software management operations may provide additional benefits to a system user, but may also place increased demands on the control and management of various system components. For example, an enhanced electronic network device that effectively manages software programs may benefit from an effective implementation because of the large amount and complexity of the digital data involved.

Due to growing demands on system resources and substantially increasing data magnitudes, it is apparent that developing new techniques for managing software in electronic networks is a matter of concern for related electronic technologies. Therefore, for all the foregoing reasons, developing effective techniques for managing software in electronic networks remains a significant consideration for designers, manufacturers, and users of contemporary electronic devices.

SUMMARY

In accordance with the present invention, a system and method for providing software to client devices in an electronic network are disclosed. In certain embodiments, the software includes trial software (trialware) that is provided without cost to device users for temporary evaluation and potential purchase. In one embodiment, various types of relevant profile information is initially collected relating to respective device users and their corresponding client devices. The profile information may be gathered in any effective manner. For example, the devices users may provide responses to profile questionnaires during an initial setup of their corresponding user devices. Profile modules of the client devices may utilize the collected profile information to generate client profiles that uniquely represent and describe the respective device users.

The client devices may then transmit the client profiles to a software server by utilizing any effective transmission techniques. The software server may determine whether a social network has been previously formed or defined to include certain specific device users and their corresponding user devices. If a social network exists, then a recommendation engine of the software server accesses previously collected social network statistics that describe various types of transactions performed by the client devices in the social network.

The recommendation engine next performs a recommendation analysis using the client profiles in conjunction with any social network statistics. The recommendation engine then generates recommendation lists of ranked software candidates based upon the foregoing recommendation analysis. Finally, the software server automatically provides recommended items from the recommendation lists to appropriate targeted ones of the device users through their respective client devices. For at least the foregoing reasons, the present invention therefore provides an improved system and method for effectively providing software to client devices in an electronic network.

BRIEF DESCRIPTION OF THE DRAWINGS

FIG. 1A is a block diagram of an electronic network, in accordance with one embodiment of the present invention;

DETAILED DESCRIPTION

Figure 1B:
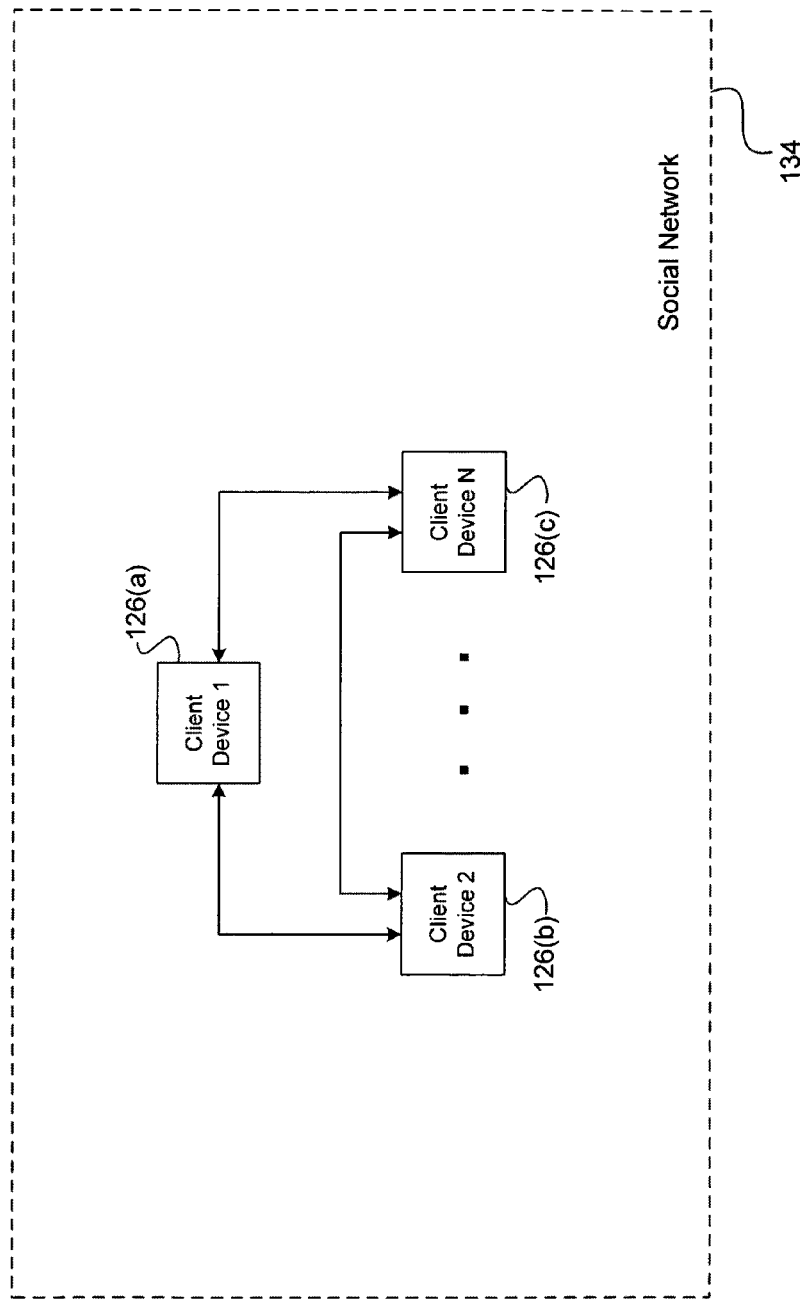
FIG. 1B is a block diagram of the social network of FIG. 1A, in accordance with one embodiment of the present invention.

The present invention relates to an improvement in electronic information management techniques. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Therefore, the present invention is not intended to be limited to the embodiments shown, but is to be accorded the widest scope consistent with the principles and features described herein.

The present invention comprises a system and method for effectively supporting software distribution in an electronic network, and includes a software server and a network of client devices. The software server stores software items received from a software provider. The software items include various types of trial software that is provided to device users for temporary evaluation and potential purchase. A recommendation engine of the software server creates recommendation lists to identify optimal candidates from among the stored software items for performing automatic and transparent software download procedures. The recommendation engine creates the recommendation lists by analyzing selectable software-ranking criteria relating to device users of the client devices. The software server then downloads the optimal candidates from the stored software items to respective target devices during the software download procedures.

Referring now to FIG. 1A, a block diagram of an electronic network 110 is shown, in accordance with one embodiment of the present invention. In the FIG. 1A embodiment, electronic network 110 may include, but is not limited to, a software provider 114, a software server 118, and a plurality of client devices 126. In alternate embodiments, electronic network 110 may be implemented by utilizing components and configurations in addition to, or instead of, certain of those components and configurations discussed in conjunction with the FIG. 1A embodiment.

In the FIG. 1A embodiment, software provider 114 may be implemented as any appropriate entity for providing software or other information to software server 118 and client devices 126. In the FIG. 1A embodiment, software provider 114 may provide any desired type of information in any appropriate format. For example, the provided information may include, but is not limited to, trialware (trial software that is provided without cost to device users of the client devices 126 for evaluation and potential purchase), offers to purchase or evaluate software, updates to existing software, and new software programs released after the manufacture of the client devices 126.

In the FIG. 1A embodiment, software server 118 may be operated by a software distribution entity to locally store and distribute the foregoing information received from software provider 114 in a targeted manner. Software server 118 may utilize a recommendation engine to create recommendation lists that identify appropriate download items for automatically and transparently downloading to one or more of the client devices 126. In the FIG. 1A embodiment, client devices 126 may include an electronic device 1 (126(a)) through an electronic device N 126(c). In certain embodiments, client devices 126 may be utilized by corresponding device users in a social network 134. In the FIG. 1A embodiment, each of the client devices 126 may bi-directionally communicate directly with other ones of the client devices 126 by utilizing any appropriate peer-to-peer communication techniques or other effective communication methods.

In the FIG. 1A embodiment, an improved system and method are proposed for automatically providing trialware and other appropriate information to personal computers or other electronic devices. The proposed approach is dynamic as opposed to the existing state of the art which is static. Software server 118 may be utilized to automatically select and push appropriate trialware and other information to targeted device users through corresponding client devices 126. In accordance with the present invention, a recommendation engine may analyze various types of user profile information to automatically identify suitable trialware and other information for the individual targeted device users. The cold boot problem may be addressed by having device users complete a relatively simple profile questionnaire as part of the out-of-the-box experience or at some other appropriate time.

Traditionally, trialware is preloaded onto personal computers during the manufacture process. This preloading approach has certain distinct disadvantages. For example, preloading trialware results in an excessively large installation image for the software stored on the hard drive. In addition, preloading trialware significantly increases the installation time during the manufacture process. Often, unwanted trialware is perceived as wasted disk space by consumers, and unwanted trialware may require considerable consumer time and effort in order to be uninstalled. All of these preloading factors typically have a negative impact on a device manufacturer's image with consumers.

The present invention addresses the foregoing problems by not preloading the trialware in a non-focused "shotgun" approach. Instead, a profile module is preinstalled on client devices 126 to gather profile information about device users and their corresponding devices. These client profiles are sent to a recommendation engine of a software server 118 for automatically making intelligent selections regarding which trialware should be provided to the client devices 126, and when the downloaded trialware should be activated or deactivated. Further details regarding the implementation and utilization of the FIG. 1A electronic network 110 are discussed below in conjunction with FIG. 1B through FIG. 9B.

Referring now to FIG. 1B, a block diagram of the FIG. 1A social network 134 is shown, in accordance with one embodiment of the present invention. The FIG. 1B embodiment includes a client device 1 (126(a)), a client device 2 (126(b)), through a client device N (126(a)). In alternate embodiments, social network 134 may be implemented by utilizing components and configurations in addition to, or instead of, certain of those components and configurations discussed in conjunction with the FIG. 1B embodiment. Furthermore, social network 134 may be implemented to include any desired number of client devices 126.

In the FIG. 1B embodiment, each of the client devices 126 may bi-directionally communicate directly with any other of the client devices 126 by utilizing any desired peer-to-peer communication techniques or other effective communication methods. For example, client device 1 (126(a)) may bi-directionally communicate directly with either client device 2 (126(b)) or client device N (126(c)), and similarly, client device 2 (126(b)) may bi-directionally communicate directly with client device N (126(c)). Additional details regarding the utilization of the FIG. 1B social network 134 are further discussed below in conjunction with FIG. 9.

Figure 2:
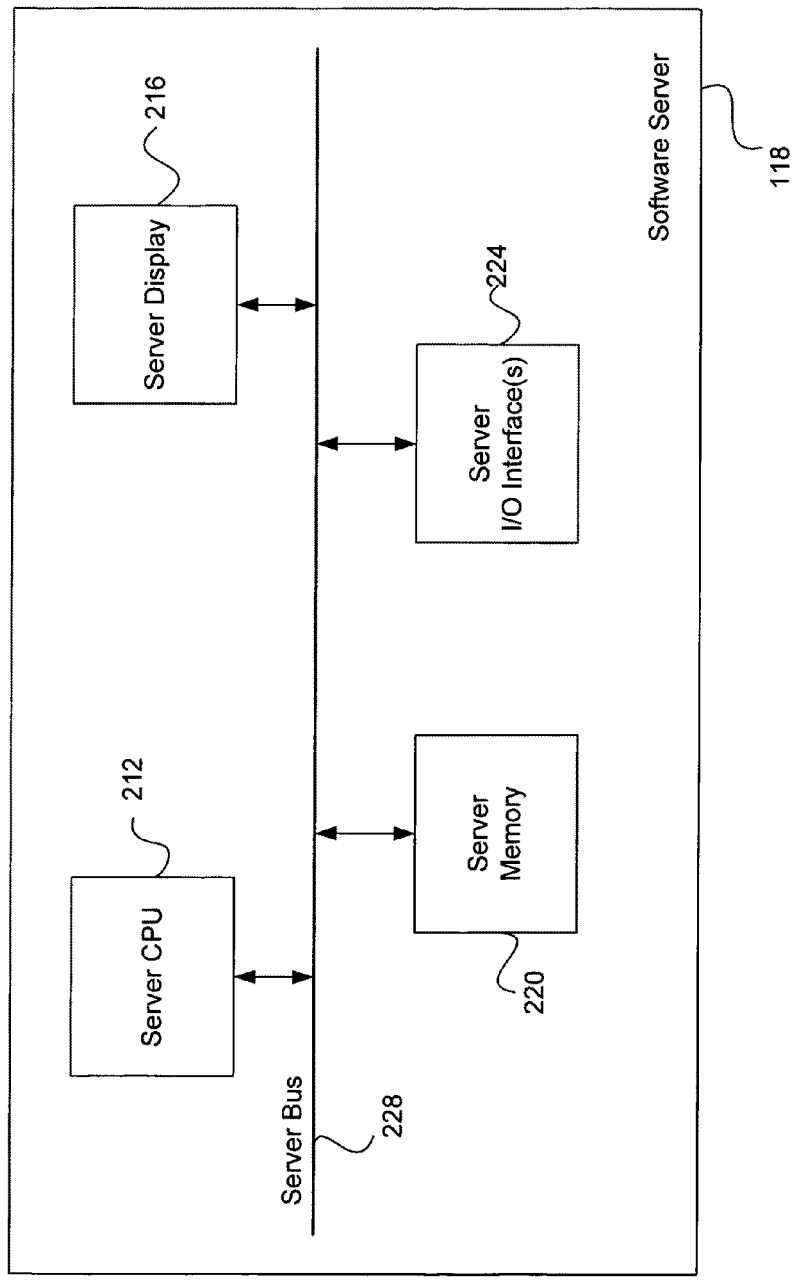
FIG. 2 is a block diagram for one embodiment of the software server of FIG. 1, in accordance with the present invention.

Referring now to FIG. 2, a block diagram for one embodiment of the FIG. 1A software server 118 is shown, in accordance with the present invention. In the FIG. 2 embodiment, software server 118 includes, but is not limited to, a server central processing unit (server CPU) 212, a server display 216, a server memory 220, and one or more server input/output interface(s) (server I/O interface(s)) 224. The foregoing components of software server 118 may be coupled to, and communicate through, a server bus 228. In alternate embodiments, software server 118 may alternately be implemented using components and configurations in addition to, or instead of, certain of those components and configurations discussed in conjunction with the FIG. 2 embodiment.

In the FIG. 2 embodiment, server CPU 212 may be implemented to include any appropriate and compatible microprocessor device that preferably executes software instructions to thereby control and manage the operation of software server 118. The FIG. 2 server display 216 may include any effective type of display technology including a cathode-ray-tube monitor or a liquid-crystal display device with an appropriate screen for displaying various information to a server user. In the FIG. 2 embodiment, server memory 220 may be implemented to include any combination of desired storage devices, including, but not limited to, read-only memory (ROM), random-access memory (RAM), and various types of non-volatile memory, such as floppy disks, memory sticks, compact disks, or hard disks. The contents and functionality of server memory 220 are further discussed below in conjunction with FIG. 3.

In the FIG. 2 embodiment, server I/O interface(s) 224 may include one or more input and/or output interfaces to receive and/or transmit any required types of information by software server 118. Server I/O interface(s) 224 may include one or more means for allowing a server user to communicate with software server 118. The implementation and utilization of software server 118 is further discussed below in conjunction with FIGS. 3-4 and 7-9B.

Figure 3:
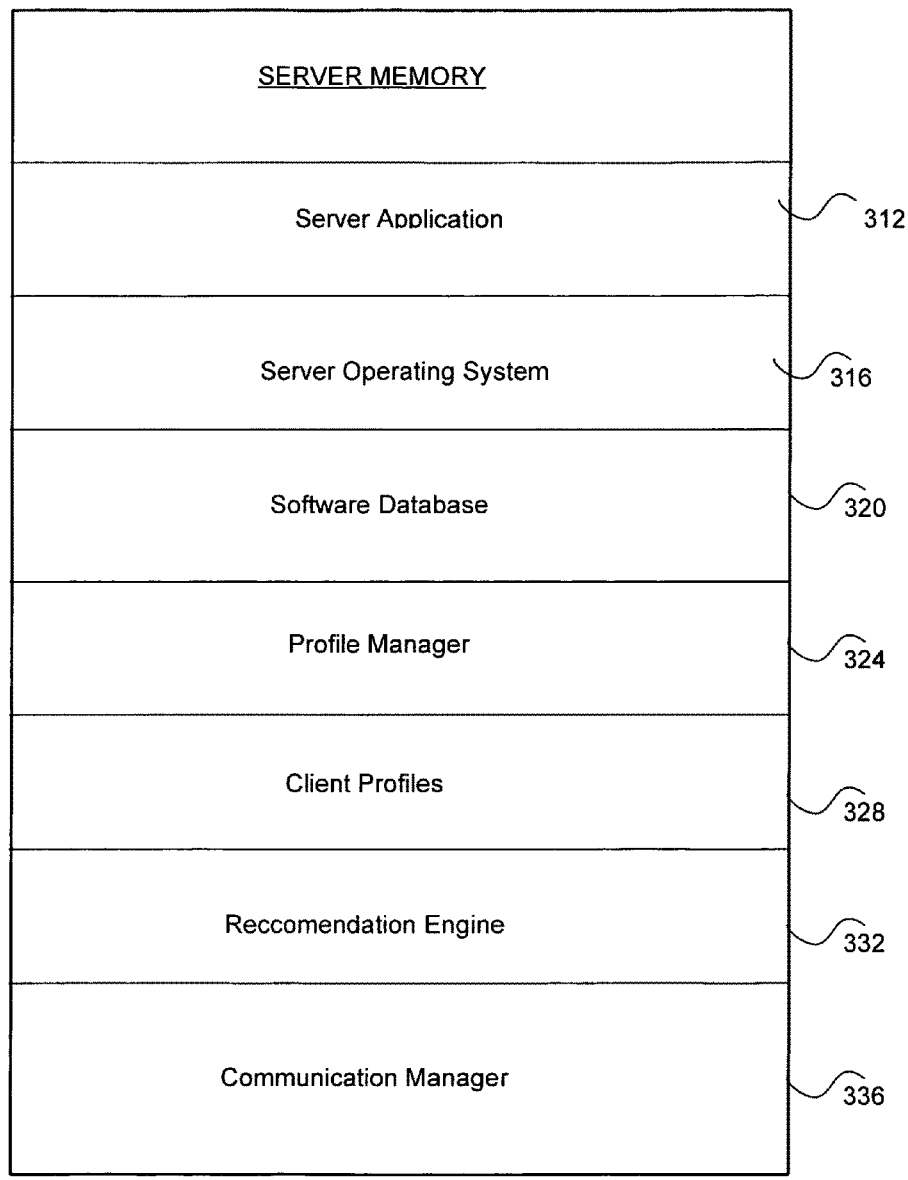
FIG. 3 is a block diagram for one embodiment of the server memory of FIG. 2, in accordance with the present invention.

Referring now to FIG. 3, a block diagram for one embodiment of the FIG. 2 server memory 220 is shown, in accordance with the present invention. In the FIG. 3 embodiment, server memory 220 may include, but is not limited to, a server application 312, a server operating system 316, a software database 320, a profile manager 324, client profiles 328, a recommendation engine 332, and a communication manager 336. In alternate embodiments, server memory 220 may include various other components and functionalities in addition to, or instead of, certain those components and functionalities discussed in conjunction with the FIG. 3 embodiment.

In the FIG. 3 embodiment, server application 312 may include program instructions that are preferably executed by server CPU 212 (FIG. 2) to perform various functions and operations for software server 118. The particular nature and functionality of server application 312 typically varies depending upon factors such as the specific type and particular functionality of the corresponding software server 118. Server operating system 316 may perform various low-level functions for software server 118.

In the FIG. 3 embodiment, software database 320 may include any appropriate type of software, trialware, or other information received by server application 312 from software provider 114 (FIG. 1) or other appropriate entity. In the FIG. 3 embodiment, profile manager 324 may be utilized to compile and analyze client profiles 328 that each include information corresponding to the client users of respective client devices 126 (FIG. 1). One embodiment of an exemplary client profile 328 is further discussed below in conjunction with FIG. 7. In the FIG. 3 embodiment, recommendation engine 332 may be utilized to analyze various types of ranking criteria to create recommendation lists for downloading specific prioritized software and other information from software database 320 to appropriate targeted client devices 126. Additional details regarding the operation and implementation of recommendation engine 332 are further discussed below in conjunction with FIGS. 4 and 8-9B. In the FIG. 3 embodiment, communication manager 336 may perform appropriate communication functions with both software provider 114 and client devices 126 to transfer trialware and other desired information.

Figure 4:
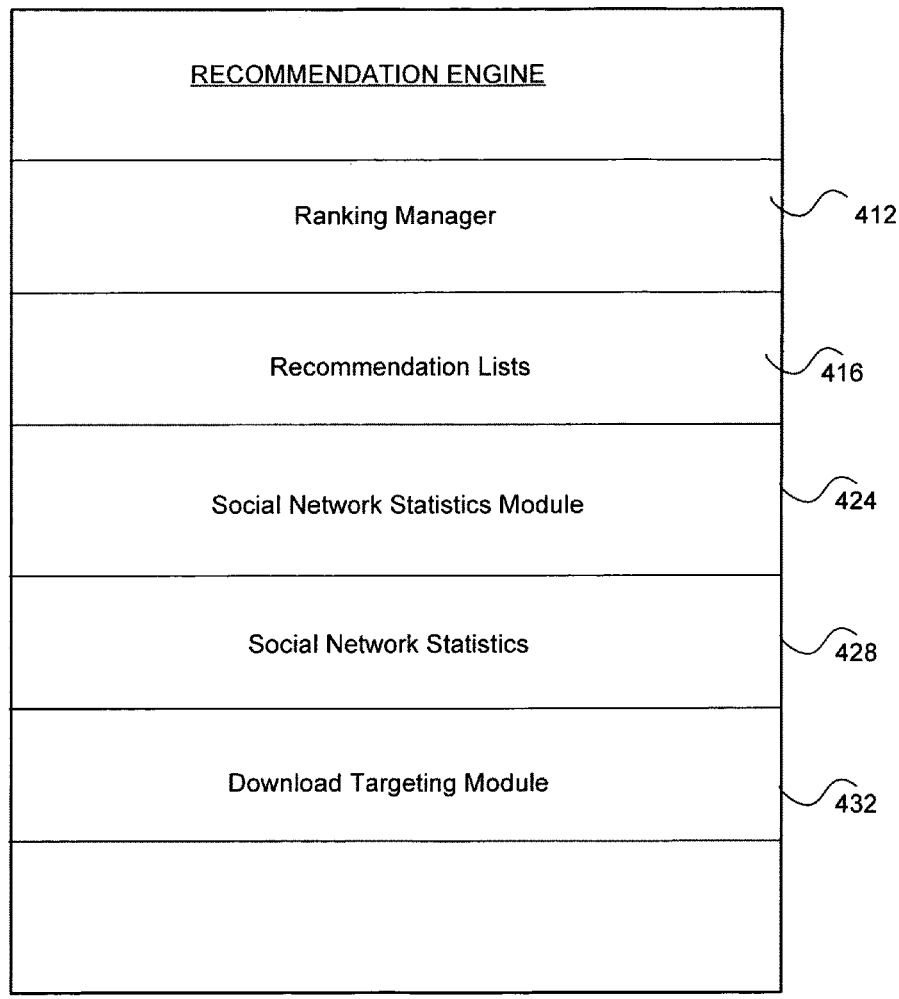
FIG. 4 is a block diagram for one embodiment of the recommendation engine of FIG. 3, in accordance with the present invention.

Referring now to FIG. 4, a diagram for one embodiment of the FIG. 3 recommendation engine 332 is shown, in accordance with the present invention. In the FIG. 4 embodiment, recommendation engine 332 may include, but is not limited to, a ranking manager 412, recommendation lists 416, a social network statistics module 424, social network statistics 428, and a download targeting module 432. In alternate embodiments, recommendation engine 332 may include other elements and configurations in addition to, or instead of, certain of those elements and configurations discussed in conjunction with the FIG. 4 embodiment.

In the FIG. 4 embodiment, recommendation engine 332 may utilize a ranking manager 412 for analyzing various relevant types of ranking criteria regarding a device user of a given client device 126 (FIG. 1) to thereby generate corresponding one of the recommendation lists 416. For example, ranking manager 412 may generate a recommendation list 416 for a given client device 126 by analyzing client attributes from a corresponding client profile 328 (FIG. 3). One embodiment for implementing a recommendation list 416 is further discussed below in conjunction with FIG. 8.

In the FIG. 4 embodiment, recommendation engine 332 may utilize a social network statistics module 424 for monitoring and compiling social network statistics 428 that reflect any appropriate information and characteristics of social network 134 (FIG. 2). For example, social network statistics 428 may include any desired type of statistical information regarding software transfer procedures for transferring software directly between client devices 126 in social network 134, or for downloading software from software server 118. In certain embodiments, social network statistics module 424 may periodically query client devices 126 to obtain updated social network statistics 428.

Alternately, client devices 126 may automatically inform social network statistics module 424 regarding any new software transfer or download procedures, and social network statistics module 424 may then update social network statistics 428. In the FIG. 4 embodiment, social network statistics 428 may be collected for each client device 126, and may include, but are not limited to, software transfer or download frequency, transferred or downloaded software types, transfer or download target devices, transfer or download source devices, transferred or downloaded software titles, and any other relevant statistical transfer patterns or information.

In the FIG. 4 embodiment, recommendation engine 332 may utilize download targeting module 432 for performing a client targeting procedure that sets transfer flags to identify specific targeted client devices 126 for automatically downloading one or more software items or other information from a recommendation list 416. Download targeting module 432 may identify appropriate target client devices 126 by utilizing any appropriate techniques. For example, download targeting module 432 may evaluate client profiles 328 (FIG. 3) and/or social network statistics 428 to determine which device users of client devices 126 would be likely to select and pay for a particular downloaded trialware item. The functionality and utilization of recommendation engine 332 are further discussed below in conjunction with FIGS. 8-9B.

Figure 5:
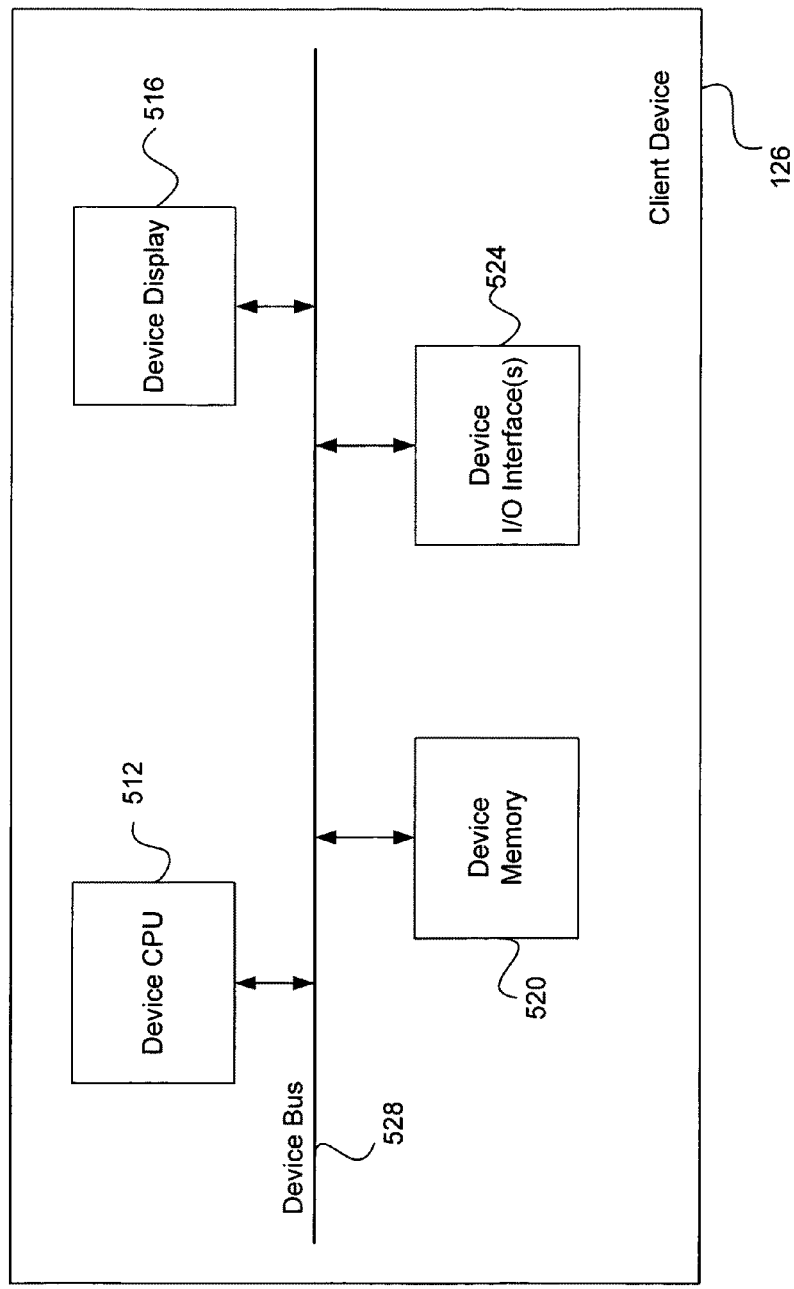
FIG. 5 is a block diagram for one embodiment of a client device from FIG. 1A, in accordance with the present invention.

Referring now to FIG. 5, a block diagram for one embodiment of a FIG. 1A client device 126 is shown, in accordance with the present invention. In the FIG. 5 embodiment, client device 126 may include, but is not limited to, a device central processing unit (device CPU) 512, a device display 516, a device memory 520, and one or more device input/output interface(s) (device I/O interface(s)) 524. The foregoing components of client device 126 may be coupled to, and communicate through, a device bus 528.

In alternate embodiments, client device 126 may readily be implemented using various components and configurations in addition to, or instead of, certain of those components and configurations discussed in conjunction with the FIG. 5 embodiment. Furthermore, in the FIG. 5 embodiment, client device 126 may be implemented as any type of appropriate electronic device. For example, in certain embodiments, client device 126 may be implemented as any type of stationary or portable consumer-electronics device, such as a television, a personal computer, a settop box, an audio-visual entertainment device, or a personal digital assistant (PDA).

In the FIG. 5 embodiment, device CPU 512 may be implemented to include any appropriate and compatible microprocessor device that preferably executes software instructions to thereby control and manage the operation of client devices 126. The FIG. 5 device display 516 may include any effective type of display technology including a cathode-ray-tube monitor or a liquid-crystal display device with an appropriate screen for displaying various information to a device user. In the FIG. 5 embodiment, device memory 520 may be implemented to include any combination of desired storage devices, including, but not limited to, read-only memory (ROM), random-access memory (RAM), and various types of non-volatile memory, such as floppy disks, memory sticks, compact disks, or hard disks. The contents and functionality of device memory 520 are further discussed below in conjunction with FIG. 6.

In the FIG. 5 embodiment, device I/O interface(s) 524 may include one or more input and/or output interfaces to receive and/or transmit any required types of information by client device 126. Device I/O interface(s) 524 may include one or more means for allowing a device user to communicate with other entities in electronic network 110 (FIG. 1A). For example, the foregoing means may include a keyboard device, a wireless remote-control device, a speech-recognition module with corresponding microphone, a graphical user interface with touch-screen capability, a hand-held device controller unit, or a selection button array mounted externally on client device 126. The implementation and utilization of client device 126 are further discussed below in conjunction with FIGS. 6 and 9.

Figure 6:
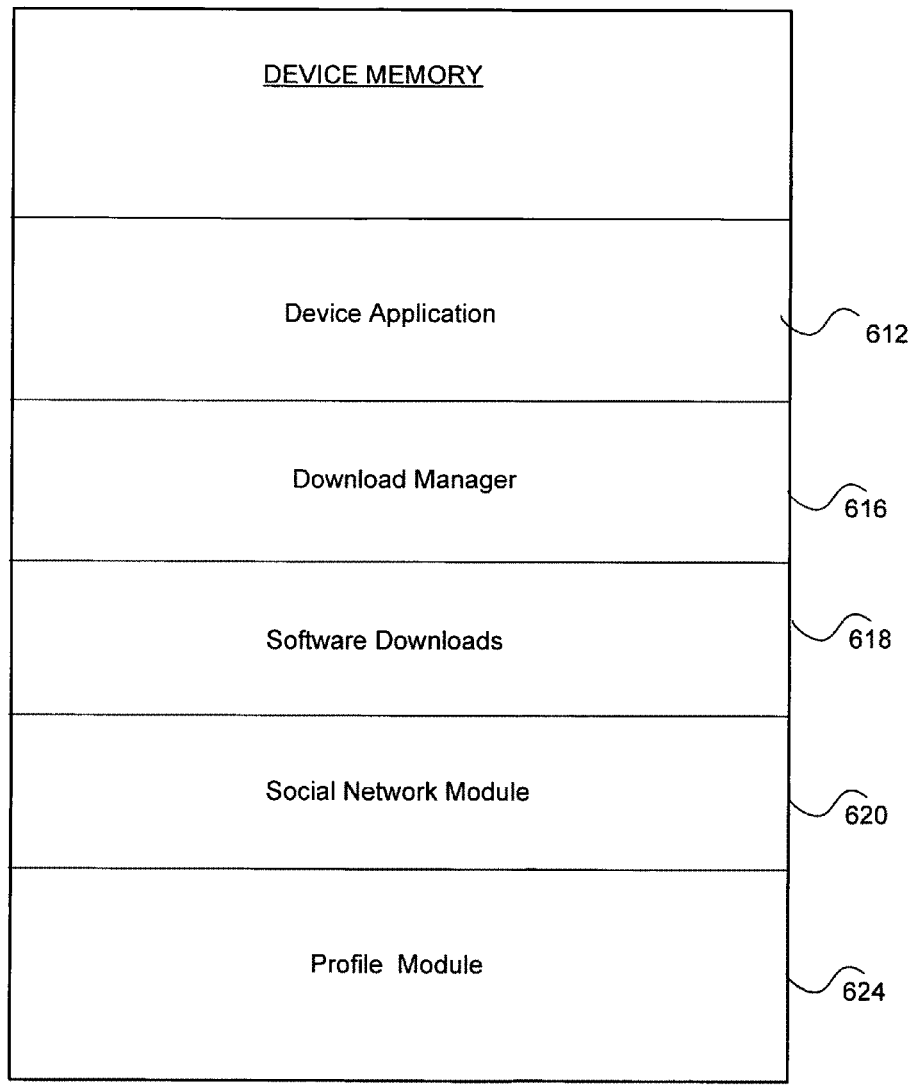
FIG. 6 is a block diagram for one embodiment of the device memory of FIG. 5, in accordance with the present invention.

Referring now to FIG. 6, a block diagram for one embodiment of the FIG. 5 device memory 520 is shown, in accordance with the present invention. In the FIG. 6 embodiment, device memory 520 includes, but is not limited to, a device application 612, a download manager 616, software downloads 618, a social network module 620, and a profile module 624. In alternate embodiments, device memory 520 may include various other components and functionalities in addition to, or instead of, certain of those components and functionalities discussed in conjunction with the FIG. 6 embodiment.

In the FIG. 6 embodiment, device application 612 may include program instructions that are preferably executed by a device CPU 512 (FIG. 5) to perform various functions and operations for a client device 126. The particular nature and functionality of device application 612 typically varies depending upon factors such as the specific type and particular functionality of the corresponding client device 126.

In the FIG. 6 embodiment, download manager 616 may perform download procedures for external entities by utilizing any appropriate techniques. For example, download manager may perform software download procedures to automatically receive and locally store software items (including trialware) from software server 118 as software downloads 618. In the FIG. 6 embodiment, social network module 620 may be utilized by a particular client device 126 to directly communicate with any other client device 126 in social network 134 (FIG. 2). For example, social network module 620 may perform a software transfer procedure to provide previously-downloaded software items from software downloads 618 to other client devices 126 in social network 134. In the FIG. 6 embodiment, client device 126 may utilize profile module 624 to create, populate, edit, and update a corresponding client profile 328 (see FIG. 3). The utilization and operation of client device 126 is further discussed below in conjunction with FIG. 9.

Figure 7:
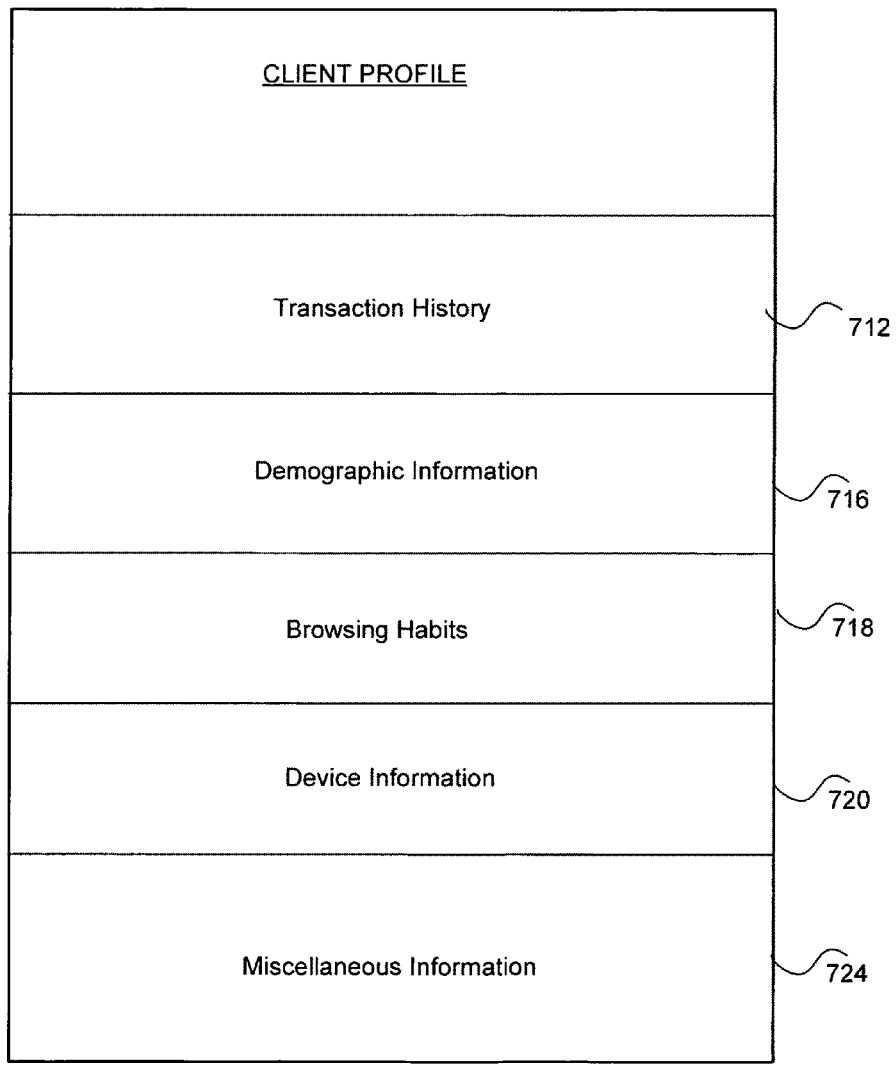
FIG. 7 is a block diagram for one embodiment of a client profile from FIG. 3, in accordance with the present invention.

Referring now to FIG. 7, a block diagram for one embodiment of a FIG. 3 client profile 328 is shown, in accordance with the present invention. In the FIG. 7 embodiment, client profile 328 includes, but is not limited to, a transaction history 712, demographic information 716, browsing habits 718, device information 720, and miscellaneous information 724. In alternate embodiments, client profile 328 may include other components and information in addition to, or instead of, certain of those components and information discussed in conjunction with the FIG. 7 embodiment.

In the FIG. 7 embodiment, transaction history 712 may include any information about software/trialware downloads from software server 118 to a given client device 126, or software/trialware transfers between individual client devices 126. For example, transaction history 712 may include, but is not limited to, software types, software titles, download or transfer frequencies, download or transfer dates, download or transfer times, software purchases, and software prices. In addition, the FIG. 7 client profile 328 may include any desired type of demographic information 716 regarding a corresponding device user. For example, demographic information 716 may include, but is not limited to, a client age, a client gender, a client location, a client ethnicity, a client marital status, client family information, a client annual income bracket, a client occupation, client hobbies, client interests, and a client political affiliation.

In the FIG. 7 embodiment, client profile 328 may include any appropriate information regarding the browsing habits 718 of a particular device user when searching or viewing information on the Internet or other information source via a corresponding client device 126. In the FIG. 7 example of client profile 328, device information 720 describing the configuration and operation of a corresponding client device 126 may be monitored and updated periodically. Device information 720 may include various types of information about the hardware and/or software configurations and capabilities of a corresponding client device 126. In the FIG. 7 embodiment, client profile 328 may also include any other desired type of miscellaneous profile information 724. Further details regarding the utilization of client profile 328 are further discussed below in conjunction with FIGS. 8-9.

Figure 8:
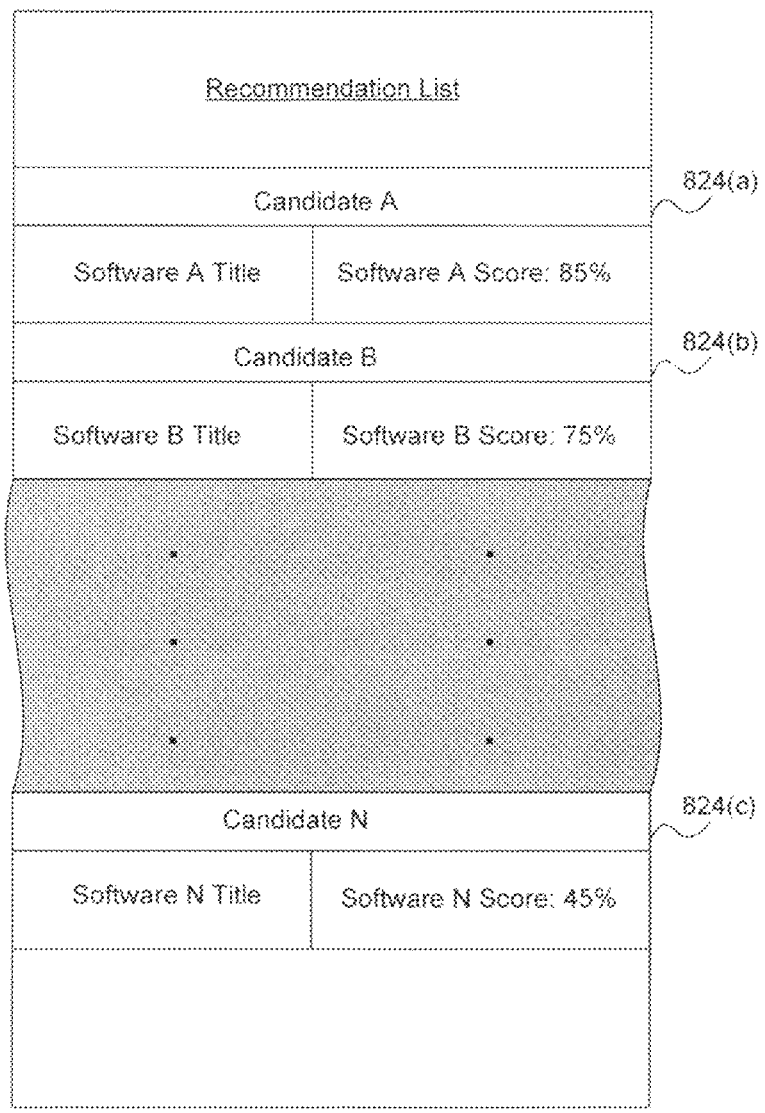
FIG. 8 is a diagram for one embodiment of a recommendation list from FIG. 4, in accordance with the present invention.

Referring now to FIG. 8, a diagram for one embodiment of a FIG. 4 recommendation list 416 is shown, in accordance with the present invention. In the FIG. 8 embodiment, recommendation list 416 includes, but is not limited to, a ranked series of candidates 824 that each represent a different software/trialware item from software database 320 of software server 118 (see FIG. 1). In alternate embodiments, recommendation list 416 may include other components and information in addition to, or instead of, certain of those components and information discussed in conjunction with the FIG. 8 embodiment.

In the FIG. 8 embodiment, recommendation list 416 includes a candidate A 824(a) through a candidate N 824(c) that each has a corresponding software title and software ranking score. For example, the FIG. 8 candidate A 824(a) includes a software A title and a software A score of 85%. In the FIG. 8 embodiment, candidate A 824(a) is therefore the optimal candidate based upon the highest software ranking score. In alternate embodiments, particular software items may be identified by any other appropriate software item designation. For example, software items may be identified by a software identification number. In addition, in certain embodiments, ranking indicators for the transfer candidates 824 may be implemented in any other effective manner. For example, a numerical merit indicator other than a percentage may alternately be utilized.

In the FIG. 8 embodiment, a ranking manager 412 of recommendation engine 332 (FIG. 4) calculates the software ranking scores to generate the ranked recommendation list 416 by analyzing any appropriate types of information. For example, ranking manager 412 may generate recommendation list 416 for a given client device 126 by analyzing predetermined ranking criteria that may include device user attributes and client device characteristics from a corresponding client profile 328 (FIG. 7).

Furthermore, ranking manager 412 may analyze the predetermined ranking criteria by utilizing any effective techniques and procedures. For example, in certain embodiments, ranking manager 412 may perform a weighted averaging of the different ranking factors from the ranking criteria to determine a cost function that represents the likelihood of selecting and paying for the downloaded software item by a device user. Each of the various ranking factors may be associated with a different weighting value that represents the approximate significance of the corresponding ranking factor. The generation and utilization of recommendation lists 416 are further discussed below in conjunction with FIGS. 9A-B.

Figure 9A:
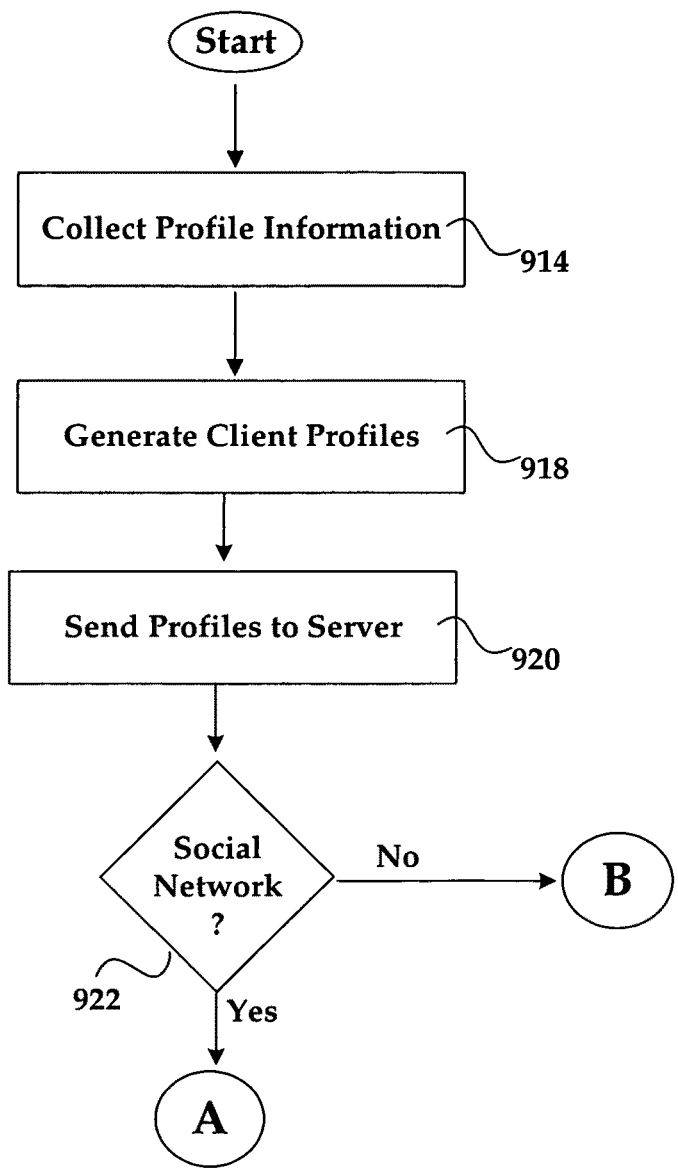
FIGS. 9A-B are a flowchart of method steps for effectively providing software to client devices in an electronic network, in accordance with one embodiment of the present invention.
Figure 9B:
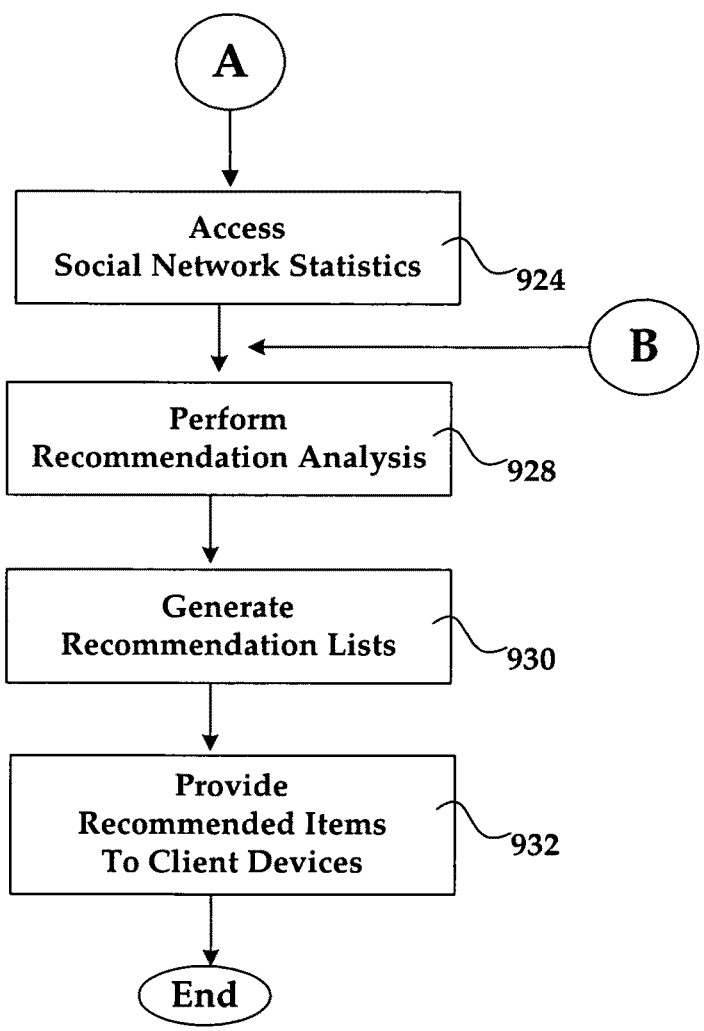

Referring now to FIGS. 9A and 9B, a flowchart of method steps for effectively providing software to client devices 126 is shown, in accordance with one embodiment of the present invention. The FIG. 9 flowchart is presented for purposes of illustration, and in alternate embodiments, the present invention may utilize steps and sequences other than those steps and sequences discussed in conjunction with the FIG. 9 embodiment.

In the FIG. 9A embodiment, in step 914, various types of relevant profile information is collected relating to respective device users and their corresponding client devices 126. The profile information may be gathered in any effective manner. For example, the devices users may provide responses to profile questionnaires during an initial setup of their corresponding client devices 126. In step 918, profile modules 624 of the user devices 126 may utilize the collected profile information to generate client profiles 328 that uniquely represent and describe the respective device users.

In step 920, the client devices 126 may transmit the client profiles 328 to a software server 118 by utilizing any effective transmission techniques. In step 922, the software server 118 determines whether a social network 134 has been previously formed or defined to include certain specific device users and their corresponding client devices 126. If a social network 134 exists, then the FIG. 9A flowchart advances to step 924 of FIG. 9B through connecting letter A. Alternatively, if there is no social network 134, then the FIG. 9A flowchart advances to step 928 of FIG. 9B through connecting letter B.

In step 924, if there is a social network, then a recommendation engine 332 of the software server 118 accesses previously collected social network statistics 428 that describe various types of transactions and operations performed by the client devices 126 in the social network 134. In step 928, the recommendation engine 332 performs a recommendation analysis using the client profiles 328 in conjunction with any social network statistics 428.

In step 930, recommendation engine 332 generates recommendation lists 416 of ranked software candidates 824 based upon the results of the foregoing recommendation analysis. Finally, in step 932, software server 118 provides recommended items from the recommendation lists 416 to appropriate targeted ones of the device users through their client devices 126. For at least the foregoing reasons, the present invention therefore provides an improved system and method for effectively providing software to client devices in an electronic network.

The invention has been explained above with reference to certain embodiments. Other embodiments will be apparent to those skilled in the art in light of this disclosure. For example, the present invention may readily be implemented using certain configurations and techniques other than those described in the specific embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for supporting software distribution in an electronic network, comprising:
a software server that stores software items received from a software provider;
a recommendation engine that creates a recommendation list by analyzing targeting information to identify an optimal candidate from among said software items for performing a software download procedure, said targeting information including social network statistics that describe one or more types of transactions performed in a social network and client profile information; and
client devices that are connected to said software server through said electronic network, said software server downloading said optimal candidate to a target device from said client devices during said software download procedure.

2. The system of claim 1 wherein said optimal candidate is trial software that is provided without cost to a device user of said target device for a temporary evaluation and a potential purchase.

3. The system of claim 2 wherein said target device is initially provided to said device user without any of said trial software being preloaded in an untargeted manner by a device manufacturer.

4. The system of claim 1 wherein said software server provides to said target device an offer to download one or more of said software items.

5. The system of claim 1 wherein said software items include software updates and software programs released after a manufacturing date of said target device.

6. The system of claim 1 further comprising a profile module that compiles a client profile corresponding to a device user of said target device, said client profile being analyzed to create said recommendation list, said client profile comprising client download transaction histories, client demographic information, client Internet browsing patterns, and hardware/software configurations of said target device.

7. The system of claim 1 further comprising a social network statistics module that compiles said social network statistics regarding trialware transactions of said device users that form said social network, said trialware transactions including downloads from said software server, said social network statistics being utilized by said recommendation engine to target said device users from said social network.

8. The system of claim 1 further comprising a download targeting module for performing a client targeting procedure that sets a transfer flag to identify said target device, said download targeting module evaluating a client profile of said target device to determine whether a device user of said target device is likely to select and purchase said optimal candidate.

9. The system of claim 1 wherein a ranking manager of said recommendation engine performs a trialware ranking procedure to create said recommendation list by analyzing predefined ranking criteria from a client profile of a device user of said target device, a profile manager of said software server periodically performing a profile update procedure to update said client profile to reflect any recent software download activity by said target device.

10. The system of claim 1 wherein a communication manager of said software server automatically and transparently performs said software download procedure to push said optimal candidate of said recommendation list to said target device.

11. A target device for receiving software distribution in an electronic network, comprising:
    a profile module that compiles a client profile corresponding to a device user of said target device,
    said client profile and targeting information being utilized by a recommendation engine of a software server to create a recommendation list that identifies an optimal candidate from among software items for performing a software download procedure, said targeting information including social network statistics that describe one or more types of transactions performed in a social network and said client profile;
    a download manager that downloads said optimal candidate to said target device; and
    a processor device that controls said profile module and said download manager.

12. The target device of claim 11 wherein said optimal candidate is trial software that is provided without cost to a device user of said target device for a temporary evaluation and a potential purchase.

13. The target device of claim 12 wherein said target device is initially provided to said device user without any of said trial software being preloaded in an untargeted manner by a device manufacturer.

14. The target device of claim 11 wherein said software server provides to said target device an offer to download one or more of said software items.

15. The target device of claim 11 wherein said software items include software updates and software programs released after a manufacturing date of said target device.

16. The target device of claim 11 wherein said client profile is analyzed to create said recommendation list, said client profile comprising client download transaction histories, client demographic information, client Internet browsing patterns, and hardware/software configurations of said target device.

17. The target device of claim 11 further comprising a social network statistics module that compiles said social network statistics regarding trialware transactions of said device users that form said social network, said trialware transactions including downloads from said software server, said social network statistics being utilized by said recommendation engine to target said device users from said social network.

18. The target device of claim 11 further comprising a download targeting module for performing a client targeting procedure that sets a transfer flag to identify said target device, said download targeting module evaluating a client profile of said target device to determine whether a device user of said target device is likely to select and purchase said optimal candidate.

19. The target device of claim 11 wherein a ranking manager of said recommendation engine performs a trialware ranking procedure to create said recommendation list by analyzing pre-defined ranking criteria from a client profile of a device user of said target device, a profile manager of said software server periodically performing a profile update procedure to update said client profile to reflect any recent software download activity by said target device.

20. The target device of claim 11 wherein a communication manager of said software server automatically and transparently performs said software download procedure to push said optimal candidate of said recommendation list to said target device.

* * * * *